US009158769B2

(12) United States Patent
Dunstan et al.

(10) Patent No.: US 9,158,769 B2
(45) Date of Patent: Oct. 13, 2015

(54) SYSTEMS AND METHODS FOR NETWORK CONTENT DELIVERY

(76) Inventors: Adam Dunstan, Watertown, MA (US);
Christopher W. Gunner, Harvard, MA (US); Stephan Richter, Maynard, MA (US)

( * ) Notice: Subject to any disclaimer, the term of this patent is extended or adjusted under 35 U.S.C. 154(b) by 67 days.

(21) Appl. No.: 13/161,598

(22) Filed: Jun. 16, 2011

(65) Prior Publication Data
US 2011/0302320 A1 Dec. 8, 2011

Related U.S. Application Data

(63) Continuation-in-part of application No. 12/974,589, filed on Dec. 21, 2010, now abandoned.

(60) Provisional application No. 61/355,190, filed on Jun. 16, 2010, provisional application No. 61/290,388, filed on Dec. 28, 2009.

(51) Int. Cl.
*G06F 15/173* (2006.01)
*G06F 17/30* (2006.01)
*H04L 12/18* (2006.01)
*H04L 29/08* (2006.01)
*H04L 29/06* (2006.01)

(52) U.S. Cl.
CPC ........ *G06F 17/30017* (2013.01); *H04L 12/185* (2013.01); *H04L 67/145* (2013.01); *H04L 67/146* (2013.01); *H04L 67/2842* (2013.01); *H04L 69/22* (2013.01)

(58) Field of Classification Search
CPC ........................... H04L 67/145; H04L 67/146
USPC .......................... 709/235, 238; 715/713, 730
See application file for complete search history.

(56) References Cited

U.S. PATENT DOCUMENTS

2007/0150814 A1* 6/2007 Morris .......................... 715/730

* cited by examiner

*Primary Examiner* — Adnan Mirza
(74) *Attorney, Agent, or Firm* — Seyfarth Shaw LLP; Joseph M. Walker

(57) ABSTRACT

A content delivery system including a subscriber controller and cache, a source controller configured to transmit content to the subscriber controller and cache via a multicast transmission; and a network content delivery controller (NCDC) in communication with the subscriber controller and cache and source controller. A control plane is used to communicate the delivery of control information using Extensible Messaging and Presence Protocol (XMPP) between the subscriber controller and cache, source controller, and NCDC.

21 Claims, 8 Drawing Sheets

SYSTEMS AND METHODS FOR NETWORK CONTENT DELIVERY

CROSS REFERENCES TO RELATED APPLICATIONS

This application claims the benefit of U.S. Provisional Patent Application Ser. No. 61/355,190, filed Jun. 16, 2010 and is a continuation-in-part (CIP) of U.S. patent application Ser. No. 12/974,589, filed Dec. 21, 2010, which claims the benefit of U.S. Provisional Patent Application Ser. No. 61/290,388, filed Dec. 28, 2009, the contents of which are incorporated herein by reference in their entirety.

FIELD

The systems and methods disclosed herein relate generally to information networks. More particularly, the systems and methods disclosed herein relate to systems and methods for network content delivery.

BACKGROUND

First invented in 1998, the Extensible Messaging and Presence Protocol (XMPP) is a real-time communication technology based on core protocols and developed by the XMPP open source community. XMPP is used for various applications such as instant messaging, presence, multi-party chat, voice and video calls, collaboration, lightweight middleware, content syndication, and generalized routing of XML data. The XMPP Standards Foundation is an open standards development organization that defines open protocols for presence, instant messaging, and real-time communication. Such applications are based on a decentralized infrastructure for internet communication.

Currently, two methods, unicast and broadcast are used to deliver content such as video and multimedia to consumers from content providers. Unicast, the predominant choice for communication and content delivery via the Internet, delivers the same data stream to each consumer. This results in particular content being potentially transmitted multiple times through the network. In terms of multimedia streams, the required network capacity is the number of consumers times the bit rate of the content, which creates a limit to the number of consumers that the system can support. Broadcast, the method used by cable companies to deliver TV stations, delivers all available content streams all the times. The required network capacity is the number of channels times the bit rate of the content, which creates a limit to the number of channels that the system can support assuming constant network capacity.

SUMMARY

The systems and methods for network content delivery disclosed herein enable content providers, such as content/cable providers in the cable industry, to increase network capacity to support more consumers, more content channels and to free up bandwidth for other network use without having to add additional hardware. In an illustrative embodiment, the systems and methods for network content delivery provide a scalable, HTTP-based content delivery system (CDS) for large networks that enables efficient delivery of content, specifically multimedia, on such large networks. Typically, the CDS utilizes multicast to deliver content to all interested consumers without duplicating any data flow and to minimize the load on edge routers.

In an illustrative embodiment, the CDS is designed to improve the content delivery for HTTP-based content transfer. The CDS uses HTTP-based content transfer because caching is part of the HTTP original design. Furthermore, the target audiences of the CDS, including cable providers, typically use HTTP to deliver multimedia content to consumers using, for example, HTTP-based multimedia clients such as Microsoft® Silverlight® Smooth Streaming.

In an illustrative embodiment, the CDS embraces HTTP by injecting transparent HTTP proxies at critical edges of the network. The CDS uses these proxies to provide entry points into bandwidth-efficient content delivery. Internally the CDS uses multicast transmissions to optimize the content delivery. In an illustrative embodiment, a control plane to communicate the delivery of control information across all logical components of the CDS. The control plane may be implemented using Extensible Messaging and Presence Protocol (XMPP) as its communication protocol since XMPP provides a high degree of scalability. However, it should be appreciated that alternative protocols can be used.

In an illustrative embodiment, the CDS includes at least one consumer device, at least one subscriber controller and cache, at least one source controller, at least one content source server, at least one network content delivery controller (NCDC), and at least one HTTP server. The source controller manages the sending of multicast data based on incoming HTTP requests and/or other policy. The subscriber controller and cache decides whether a request for content is forwarded to the HTTP server, source controller, or served directly from the local cache of the subscriber controller and cache to the consumer device. The NCDC manages the control plane of the CDS. Illustratively, the control plane communicates the types of requests that are handled by the CDS between the subscriber controller and cache, the source controller, and the NCDC.

In an illustrative embodiment, the subscriber controller and cache and the source controller register with a multi-user chat (MUC) by sending messages to the NCDC in XMPP. The NCDC then transmits a multicast group list in XMPP to each of the subscriber controller and cache and the source controller. In response to the NCDC transmission, the source controller creates a multicast transmission. The subscriber controller and cache subscribes to the multicast transmission to receive content via multicast.

BRIEF DESCRIPTION OF THE DRAWINGS

The systems and methods disclosed herein are illustrated in the figures of the accompanying drawings which are meant to be exemplary and not limiting, in which like references are intended to refer to like or corresponding parts, and in which.

DETAILED DESCRIPTION

Detailed embodiments of the systems and methods for network content delivery are disclosed herein, however, it is to be understood that the disclosed embodiments are merely exemplary of the systems and methods, which may be embodied in various forms. Therefore, specific functional details disclosed herein are not to be interpreted as limiting, but merely as a basis for the claims and as a representative basis for teaching one skilled in the art to variously employ the systems and methods disclosed herein.

Generally, the systems and methods disclosed herein include and may be implemented within a computer system or network of computer systems having one or more databases and other storage apparatuses, servers, and additional components, such as processors, modems, terminals and displays, computer-readable media, algorithms, modules, and other computer-related components. The computer systems are especially configured and adapted to perform the functions and processes of the systems and methods as disclosed herein.

Communications between components in the systems and methods disclosed herein may be bidirectional electronic communication through a wired or wireless network. For example, one component may be networked directly, indirectly, through a third party intermediary, wirelessly, over the Internet, or otherwise with another component to enable communication between the components.

Figure 1:
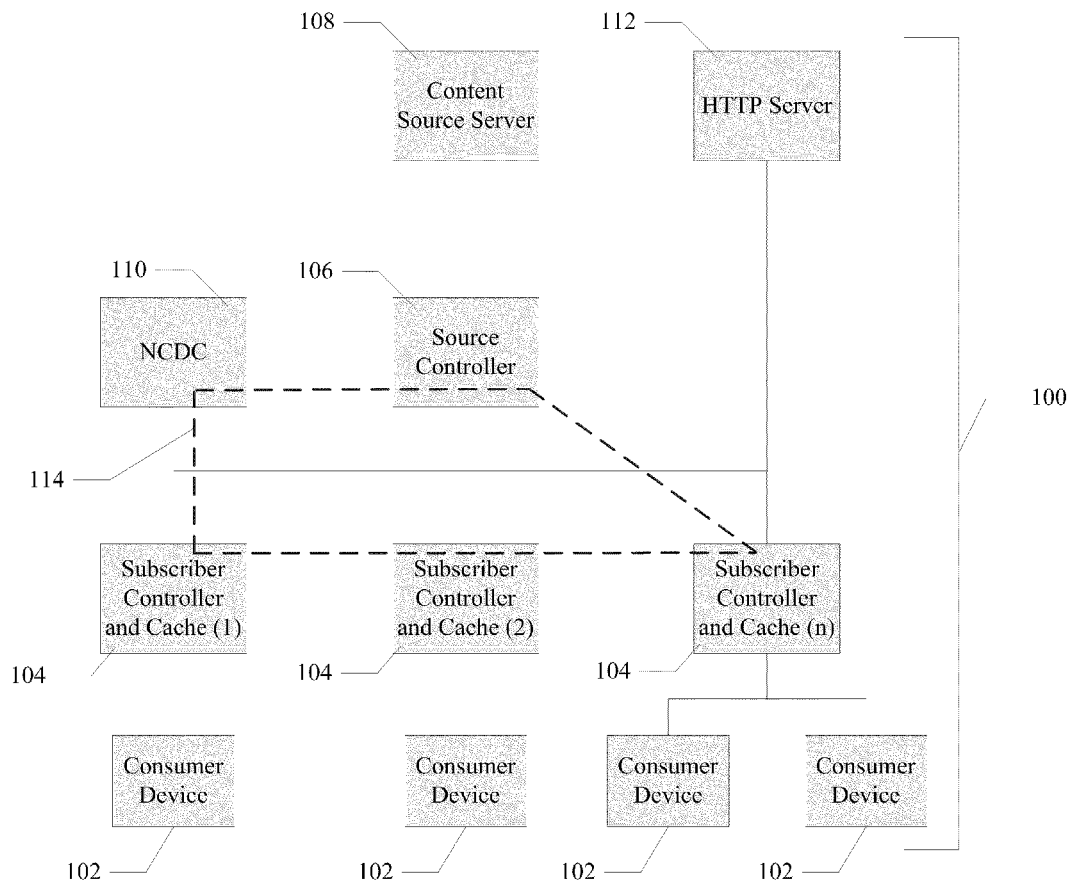
FIG. 1 illustrates an embodiment of a content delivery system (CDS) architecture for implementing the systems and methods for network content delivery.

A system architecture for implementing the systems and methods for network content delivery according to an illustrative embodiment is described with reference to FIG. 1. As illustrated, the system is a content delivery system (CDS) 100. In an illustrative embodiment, the CDS 100 is designed to allow content delivery via regular hypertext transfer protocol (HTTP) requests and uses a simple, scalable multicast transmission protocol. Typically, the CDS 100 utilizes multicast to deliver content to all interested consumers without duplicating any data flow and to minimize the load on edge routers and network connections between systems. Alternatively, when the CDS 100 is not available for one reason or another, the overall network behavior may simply fall back to using HTTP protocol and unicast transmission of content.

In an illustrative embodiment, the CDS 100 typically includes at least one consumer device 102, at least one subscriber controller and cache 104, at least one source controller 106, at least one content source server 108, at least one network content delivery controller (NCDC) 110, and at least one HTTP server 112. In an illustrative embodiment, the consumer device 102 is a device, such as but not limited to a television, cable modem, set top box, computer, or other device capable of receiving and/or displaying multimedia content.

In an illustrative embodiment, the subscriber controller and cache (also referred to herein as the subscriber controller) 104 is in communication with the consumer device 102, the source controller 106, the NCDC 110, and the HTTP server 112. The subscriber controller and cache 104 ensures that content is delivered from the cache of the subscriber controller and cache 104 to the consumer device 102 when available, avoiding unneeded requests over the network. The subscriber controller and cache 104 is typically part of a home gateway. The subscriber controller and cache 104 is typically a device that sits at the edge of a consumer's network, such as but not limited to a server, computer, processor, database, and/or set top box including a modem, router, and/or various software. Additionally, the subscriber controller and cache 104 can manage multicast clients, which are instances of receiving the multicast content stream. Variants of the subscriber controller and cache 104 are used as network-to-network gateways to allow distribution of content from one provider network into another; and as hierarchical components in a large single provider network to provide scalability.

In an illustrative embodiment, the source controller 106 is in communication with the subscriber controller and cache 104, the content source server 108, and the NCDC 110. The source controller 106 illustratively is a server, computer, processor, and/or other device capable of receiving and transmitting content. The source controller 106 handles incoming requests for content from the subscriber controller and cache 104. The source controller 106 manages multicast servers, which are instances of serving a multicast content stream, whether running locally or remotely via the NCDC 110. In a large provider network, multiple source controllers 106 may be used to provide scalability.

Additionally, the source controller 106 and the subscriber controller and cache 104 can be packaged together in one or more servers, computers, and/or processors. In an illustrative example, the source controller 106 and the subscriber controller and cache 104 can be packaged together in a Network-to-Network Gateway to allow distribution of content from one provider network into another. In another illustrative example, the source controller 106 and the subscriber controller and cache 104 can be packaged together in a Distribution System, which can be a hierarchical component in a large single provider network to provide scalability.

In an illustrative embodiment, the content source server 108 is in communication with the source controller 106. The content source server 108 is typically a HTTP server or other device capable of serving content files and/or file fragments to the source controller 106, such as but not limited to a server, computer, and/or processor. The content source server 108 provides multimedia content to the source controller 106 in the form of a sequence of file fragments and a manifest for each specific content, such as but not limited to a video or audio segment.

In an illustrative embodiment, the NCDC 110 is in communication with the subscriber controller and cache 104 and the source controller 106. The NCDC 110 illustratively is a server, computer, processor, and/or other device capable of communicating with the subscriber controller and cache 104 and the source controller 106. The NCDC 110 manages a control plane 114 of the CDS 100, which communicates the types of requests that are handled by the CDS 100 between the subscriber controller and cache 104, the source controller 106, and the NCDC 110. The NCDC 110 typically maintains a global state of all available delivery content, and communicates state among the source controller 106 and subscriber controller and cache 104. In a large provider network the NCDC 110 may consist of multiple physical systems that coordinate the NCDC 110 function to provide scalability.

In an illustrative embodiment, the CDS 100 includes a content provider side and a content receiver side. On the content provider side the source controller 106 manages the sending of multicast data based on incoming HTTP requests and/or other policy. On the receiver side, the subscriber controller and cache 104 decides whether a request for content is forwarded to the HTTP server 112, source controller 106, or served directly from the local cache of the subscriber controller and cache 104, which is typically filled by multicast transmission.

Requests are forwarded from the subscriber controller and cache 104 to the HTTP server 112, if the subscriber controller and cache 104 does not provide cached results. Commonly, requests are forwarded to the HTTP server 112 when the requests are non-multimedia requests, such as a Google search. In other words, the HTTP server 112 allows for non-CDS content delivery, for example the HTTP server 112 allows arbitrary Web surfing via the Internet. The subscriber controller and cache 104 uses its knowledge of Uniform Resource Locator (URL) regular expressions that match CDS content to make the determination of whether to forward the request to the HTTP server 112. That knowledge is distributed to all subscriber controllers and caches 104 using the control plane 114.

A request for content is served to the consumer device 102 from the local subscriber cache of the subscriber controller and cache 104 if the requested content exists in the subscriber controller and cache 104. In normal operation, content may exist in the subscriber controller and cache 104 as a result of unicast, broadcast, or multicast content delivery. A simple hash comparison of the URL value in the request with the URL value stored in the cache of the subscriber controller and cache 104 can be used to match a request to a result.

If a request for CDS content is not found in the subscriber controller and cache 104, the CDS 100 forwards the request to the source controller 106. The source controller 106 answers the request, typically by communicating the request to the content source server 108 and forwarding the response of the content source server 108 to the consumer device 102, via the subscriber controller and cache 104. However, at this point the source controller 106 has the opportunity to use policy to control the multicast flow. For example, in one model, an HTTP request could trigger the response of the request to be sent out to a plurality of consumer devices 102 via multicast. In a second model, the source controller 106 may respond to the request with a unicast HTTP transfer and also initiate setup of a multicast group for transmission of the same content. In addition, the source controller 106 can manipulate the response to guide the consumer device 102 into a particular behavior.

As described above, the NCDC 110 manages the control plane 114 of the CDS 100. The control plane 114 communicates the types of requests that are handled by the CDS 100 between the subscriber controller and cache 104, the source controller 106, and the NCDC 110. In an illustrative embodiment, a type of request is known as a content group or group. In multimedia terms a group usually represents a particular movie or stream. For example, the "avatar" group for a movie titled "Avatar" may be represented by the following URL regular expression: http://cdn\.a-bb\.net/avatar\ism/.*

For illustrative purposes, all of the following URL requests will match the "avatar" group:

their changes to any registered source controller 106 and subscriber controller and cache 104. The source controller 106 in return, communicates any active multicast sessions to the NCDC 110 for record keeping and provider management. The subscriber controller and cache 104 in return, communicates active multicast sessions to the NCDC 110 for record keeping and provider management.

The NCDC 110 is also capable of providing run-time information of the CDS 100 and providing management control functions to control all components of the CDS 100. For example, the NCDC 110 may allow disabling of any multicast session on any subscriber controller and cache 104.

As mentioned above, the CDS 100 typically uses multicast to transmit content to multiple consumers via the consumer devices 102 at once. The idea is that multiple consumers consume the same content at the same time. Instead of requiring one unicast stream for each consumer, only one multicast transmission is needed to serve all consumers. This is particularly true for live stream content, but even popular content on demand can benefit.

In an illustrative embodiment, each multimedia artifact, such as but not limited to a movie, a live stream, etc., is assigned to one multicast group. A multicast group is typically a specific internet protocol (IP) Multicast Address. Each active content group that the CDS 100 determines to transmit via multicast will result in the CDS 100 assigning one or more specific multicast groups to that content. Since the number of multicast groups that can be in use at any time is limited both because of the multicast group address space but more importantly because of the scaling limitations of routers used in the content provider's network, the set of available multicast groups is treated as a pool which the NCDC 110 manages. More particularly, when the source controller 106 starts a multicast transmission the source controller 106 requests an assignment of a multicast group from the NCDC 110. The NCDC 110 assigns a new multicast group to the content group and removes the assigned multicast group from the free pool.

Typically, the multimedia artifact is served up using multiple small fragments of the overall content. In an illustrative embodiment, the source controller 106 creates a multicast server on the source controller 106, which is an instance of serving a multicast content stream. The source controller 106 sends one fragment at a time to the subscriber controller and caches 104 subscribed to the multicast group. If a consumer is consuming a given multimedia artifact, the subscriber controller and caches 104 associated with that consumer simply subscribes to that multicast group or creates a multicast client on the subscriber controller and caches 104, which is an instance of receiving the multicast content stream, to receive the content. If the subscriber controller and caches 104 does not receive a desired fragment in time via multicast, the CDS

--- http://cdn\.a-bb\.net/avatar\.ism/Manifest
http://cdn\.a-bb\.net/avatar\.ism/QualityLevels(350000)/Fragments(video=0)
http://cdn\.a-bb\.net/avatar\.ism/QualityLevels(64000)/Fragments(audio=0)

---

Each group may also be given meta-data such as a title, a multicast group name and other optional attributes, such as the desired video and audio bit rates. The additional attributes can then be used within the system to manage, locate and choose content. For example, the consumer may be presented with a browsing interface, via the consumer device 102, to the meta-data to facilitate choice of content.

The NCDC 110 manages the list of all available groups. The NCDC 110 also communicates the group listings and all 100 can simply fulfill the request via unicast. This ensures proper initialization and provides interesting content delivery policy opportunities.

In an illustrative embodiment, the source point of the multicast transmission is the source controller(s) 106, and the end point is the subscriber controller and cache(s) 104. Since HTTP is a request/response based protocol, a new communication CDS multicast content delivery protocol (CMCDP) is implemented for the multicast transmission. The goals of the CMCDP are to handle out-of order packets, allow for some data loss and to not attempt to error correct.

The CMCDP may be designed to deliver multimedia content fragments. A fragment is a part of a complete multimedia content, such as but not limited to, a part of a movie. Each fragment is transmitted using multicast as a series of IP packets. In an illustrative embodiment, the CMCDP is designed to allow for out-of-order reception of packets since standard IP multipath routing techniques can result in packets traversing different network paths and arriving at a destination in a different order to that of their transmission.

The CMCDP may be designed to allow for some loss of packets. Packets may not be delivered to the destination for many reasons, including congestion on network links. The CMCDP allows for a fraction of the packets to be lost while still reassembling and using the resulting fragment. Multimedia content is still usable for consumer presentation, via the consumer devices 102 in the presence of some data loss. The amount and specific loss characteristics that are acceptable depend on properties of the multimedia content. The CMCDP can implement content-aware configurable policies for acceptable loss algorithms. An example of an acceptable loss algorithm may be a threshold packet loss rate such that if the packet loss rate measured for a fragment exceeds the configurable threshold then the fragment is discarded, otherwise it is retained.

An alternative acceptable loss algorithm extends the above example by making the configured parameters specific to a content type. For example, if the content type is MPEG encoded video. The subscriber controller and cache 104 can determine the content type either from the manifest if present in the manifest, or the subscriber controller and cache 104 may inspect the data of the fragment to detect the presence of MPEG frames for which there are well-known algorithms.

Another alternative acceptable loss algorithm extends the above examples by having a configurable frame loss threshold for MPEG and I, P and B frames. The effect of losing each of these frame types is different on the consumer device—having decreasing significance in the visual impairment from I to B frame types. Therefore, the loss threshold can be different for each frame type for a given approximate acceptable impairment threshold. To compute the loss rate of each frame type, the subscriber controller and cache 104 inspects the received data to detect each frame and its type and then maintains a frequency measurement for the occurrence of each frame type. Using the lost packet count and frequencies the subscriber controller and cache 104 predicts the approximate lost frame count of each type and from that the approximate loss rate of each type.

The CMCDP may also be designed to allow only simple error detection. Since multimedia content is still presentable to the consumer, via the consumer device 102 in the presence of some errors, the CMCDP may be optimized to only perform simple IP-level error detection. This error detection may be implemented as a standard user diagram protocol (UDP) header checksum computation and check.

In an illustrative embodiment, the source controller 106 opens a multicast socket or creates a multicast server once and keeps it permanently open. Each content fragment is transmitted by the source controller 106 to the subscriber controller and cache 104 in a unique CMCDP session. Each content fragment can be transmitted using packets that fit the path maximum transmission unit (MTU) to avoid IP packet fragmentation and reassembly overhead.

In an illustrative embodiment, each CMCDP session is assigned a session identifier (id). The id of the session is typically a Message-Digest algorithm 5 (MD5) hash of the path segment of the URL. For example, given the URL:
    http://cdn.a-bb.net/avatar.ism/QL(350000)/Frags (video=0)?token=e4a6720b The path segment is:
    /avatar.ism/QL(350000)/Frags (video=0)

Thus, the resulting session ID would be (in hex representation):
    b24e758ebb6e826d7a7fb9a4c49bbb93

In an illustrative embodiment, the CMCDP uses UDP as its protocol. The CMCDP uses a defined port number as the value of the UDP destination port to allow for demultiplexing at the subscriber controller and cache 104.

In an illustrative example, the session id is sent in all packets. Generally, a session starts with a CDS header packet of the following format:
    0x01<16 byte id> <number of packets (32-bit)>
        Byte 1: The packet type. 0x01 is the header type.
        Bytes 2-17: The session id in binary form.
        Bytes 18-21: The number of data packets of this session.

After the CDS header packet, the specified amount of data packets is sent. In an illustrative example, the specified amount of data packets is sent in the following format:
    0x02 <16 byte id> <packet number (32-bit)> <data>
        Byte 1: The packet type. 0x02 is the data type.
        Bytes 2-17: The session id in binary form.
        Bytes 18-21: The packet number (chronological id) of the data packet.
        Bytes 22-: The actual packet data. The size of the data should not exceed:
        data_size=MTU size—UDP Header—CDS Header
        For example, an IPv4 system with a standard MTU size of 1492 bytes has a maximum data size of:
        1492−28−21=1443 bytes The packet number can be used to properly reconstruct a fragment from its sequence of packets. The subscriber controller and cache 104 or the multicast client on the subscriber controller and cache 104 implements the policy under which packets are received, fragments are reassembled and packet loss is handled. While the CMCDP is described above in accordance with the illustrative example, it should be appreciated by one skilled in the art that various other protocols can be used.

Figure 2:
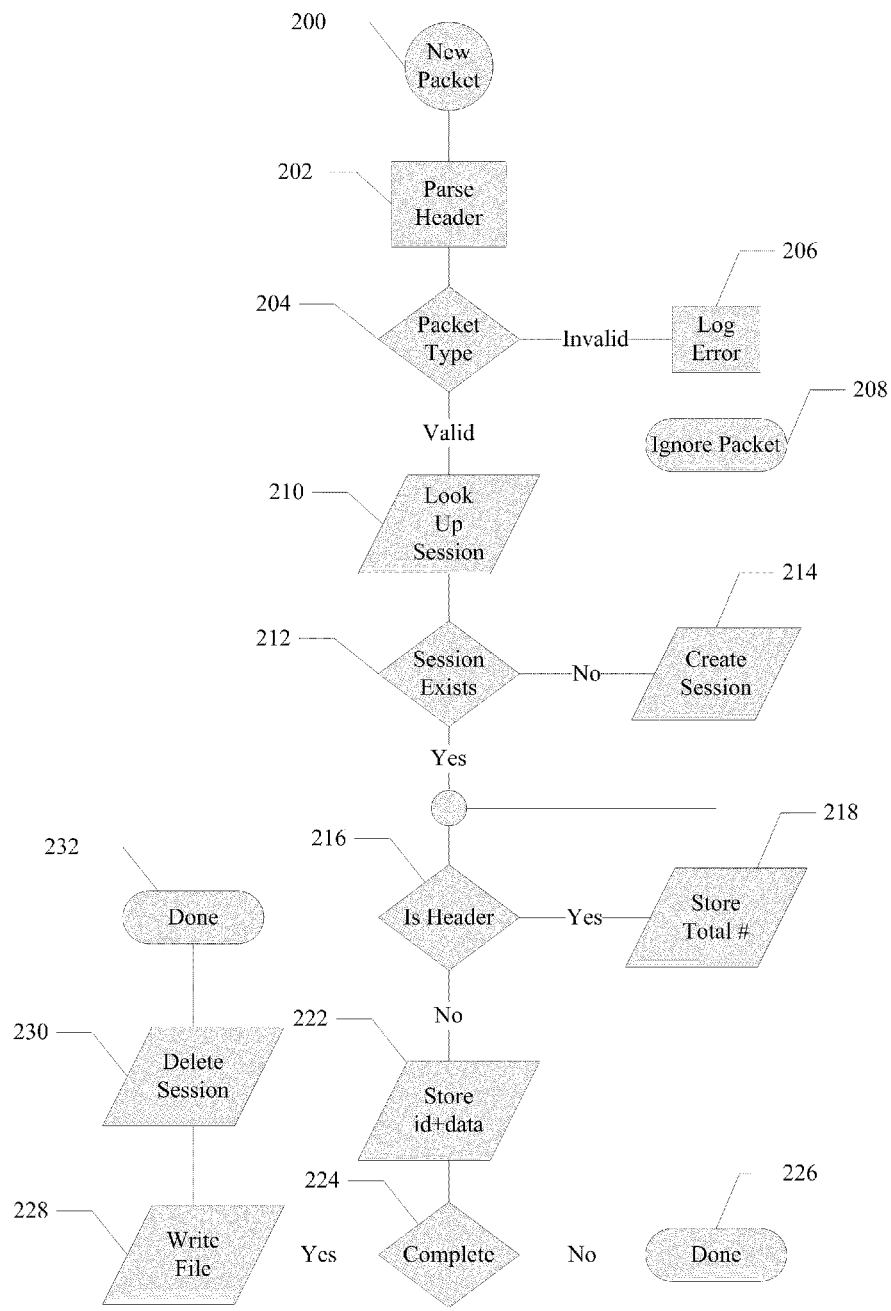
FIG. 2 illustrates a block flow diagram of an embodiment of a subscriber controller and cache handling a packet flow.

A block flow diagram of the subscriber controller and cache 104/multicast client handling a packet flow according to an illustrative embodiment is described with reference to FIG. 2. As illustrated, the subscriber controller and cache 104 receives a new packet 200 and parses the new packet's CDS header 202 to determine the CDS packet type 204. If no valid CDS packet type is found, an error is logged 206 and the new packet is ignored 208.

If a valid CDS packet type is found, the subscriber controller and cache 104 looks up the session 210 using the session id to determine if a session exists 212. If no session is found, a new session context is created 214. It does not matter whether the session initializing packet is a header or a data packet, since they might be received out of order.

The subscriber controller and cache 104 then determines whether the new packet is a header or data packet 216. If the new packet is a header, the new packet is written as a header in the session context and the number of data packets to expect is set or stored 218 on the session. If the new packet is a data packet, the data packet's data along with its data packet id is stored 222 in the session context.

A session is complete 224 when the last data packet which completes the session is received or a timeout occurs. If the new packet is not the last data packet the subscriber controller and cache 104 is done 226 or has completed processing of the new packet and the subscriber controller and cache 104 waits for additional packets. If the new packet is the last data packet which completes the session, the session's data is written 228 to disk and the session context is removed 230 from the session list. After the session context is removed 230, the subscriber controller and cache 104 is done 232 or has completed processing of the new packet and the subscriber controller and cache 104 waits for additional packets. It is irrelevant that new packets might arrive out of order as the session waits until all data has been received before performing reassembly.

In the event of packet loss, a timeout is used to determine when to stop waiting for further packets to arrive. Such a timeout can be automatically determined by using knowledge about the content itself. For example, if the content consists of 2 second duration video and audio fragments, waiting longer than 2 seconds makes no sense, since the data reception would lag the actual consumption of the data.

Once a session timeout occurs, it should be determined whether enough data was received to store the content as a valid fragment or not. Again, some content-based heuristics can be used to make this determination. In an illustrative embodiment, since it is known how many packets should have arrived, the fraction of packets that actually were received can be computed and a cutoff for storage can be created. This algorithm may be sufficient for audio, but not necessarily for video. In an illustrative embodiment, a video fragment commonly consists of a key frame and updates to that key frame. Thus, one can mandate that key frames are not lost while allowing for some fractional loss rate of update frames.

Figure 3:
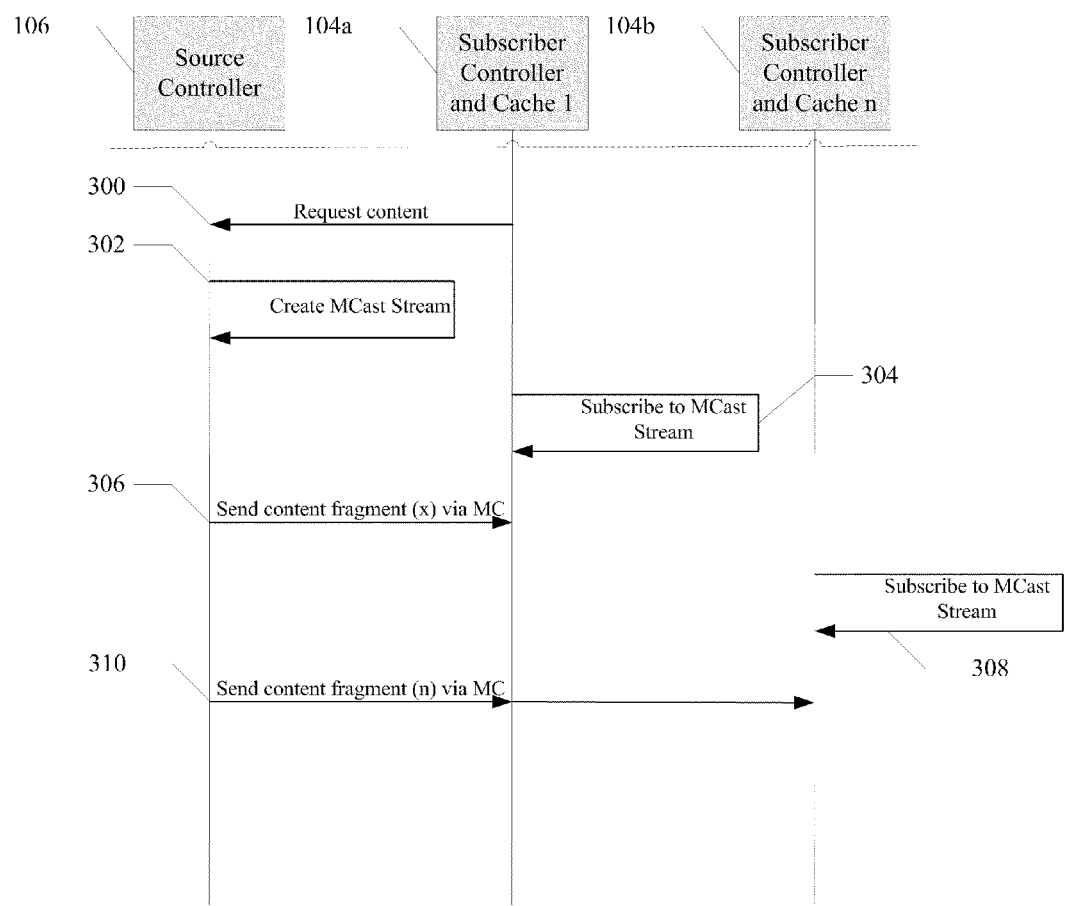
FIG. 3 illustrates a flow diagram of an embodiment of a live stream delivery method.

As described above, the CDS 100 typically utilizes multicast to deliver content to all interested consumers. Based on the type of multimedia content, several policies can be deployed to serve the content via multicast. In an illustrative embodiment, a live stream delivery is used. Typically, normal viewing of a live stream starts on request with the latest available content and then continues indefinitely. Thus, it is desirable to start serving the content via multicast as soon as it becomes available. In one potential policy, the first consumer of the live stream causes the source controller 106 to start transmitting the content via multicast. At this point any subscriber controller and cache 104 subscribing to the live stream will immediately receive files or file fragments for its cache. A flow diagram of a live stream delivery method according to an illustrative embodiment is described with reference to FIG. 3. As illustrated in FIG. 3, a first subscriber controller and cache 104a sends a request 300 to the source controller 106 for the live content. The source controller 106 creates 302 a multicast stream for the live content. Once the multicast stream is created, the first subscriber controller and cache 104a can subscribe 304 to the multicast stream.

The source controller 106 then sends 306 the live content files or file fragments to the subscribed subscriber controller and cache 104a via the multicast stream. Further, a second subscriber controller and cache 104b can subscribe 308 to the multicast stream to receive the live content files or file fragments. As illustrated in FIG. 3, the source controller 106 sends 310 the live content files or file fragments to all of the subscribed subscriber controller and caches 104a and 140b via the multicast stream.

In an illustrative embodiment, a buffer may be created to ensure that the source controller 106 can deliver the content before it is requested by the subscriber controller and caches 104a and 104b. This buffer can be easily achieved by having the subscriber controller and caches 104a and 104b trail the actual live content by a number of fragments. See "Microsoft Smooth Streaming" for a concrete example of accomplishing this. In this case the subscriber controller and caches 104a and 104b receive the first few seconds, the depth of the buffer in seconds, via unicast while at the same time receiving the multicast content. By imposing a delay of the buffer depth in seconds on display to the consumer via the consumer device 102, the subscriber controller and caches 104a and 104b can ensure that a buffer of the next few seconds of content is maintained. This allows the subscriber controller and caches 104a and 104b to adapt to network delay and to detect delay and switch between bit rates of the content.

A policy might be implemented in the source controller 106 to shut down a live stream. The simplest method is to leave the live stream running forever. If there is no subscriber controller and cache 104a or 104b subscribed to the multicast stream, the router handling the multicast routing closest to the source controller 106 will simply ignore the packets and throw them away. Another policy might shut down the live stream after a certain amount of time after the last subscriber controller and cache 104a or 104b has unsubscribed from the stream. Knowledge of which subscriber controller and caches 104a and 104b are members of the stream or group is maintained through the control plane 114 as explained earlier.

In an illustrative embodiment, a driven delivery is used. For pre-recorded (on-demand) content, the live stream delivery policy is less desirable, since the source controller 106 might send the last fragments of the content before the subscriber controller and cache 104 subscribes to the content. In this case the subscriber controller and cache 104 will request most of the content via unicast and thus minimize the effect of the multicast delivery.

Figure 4:
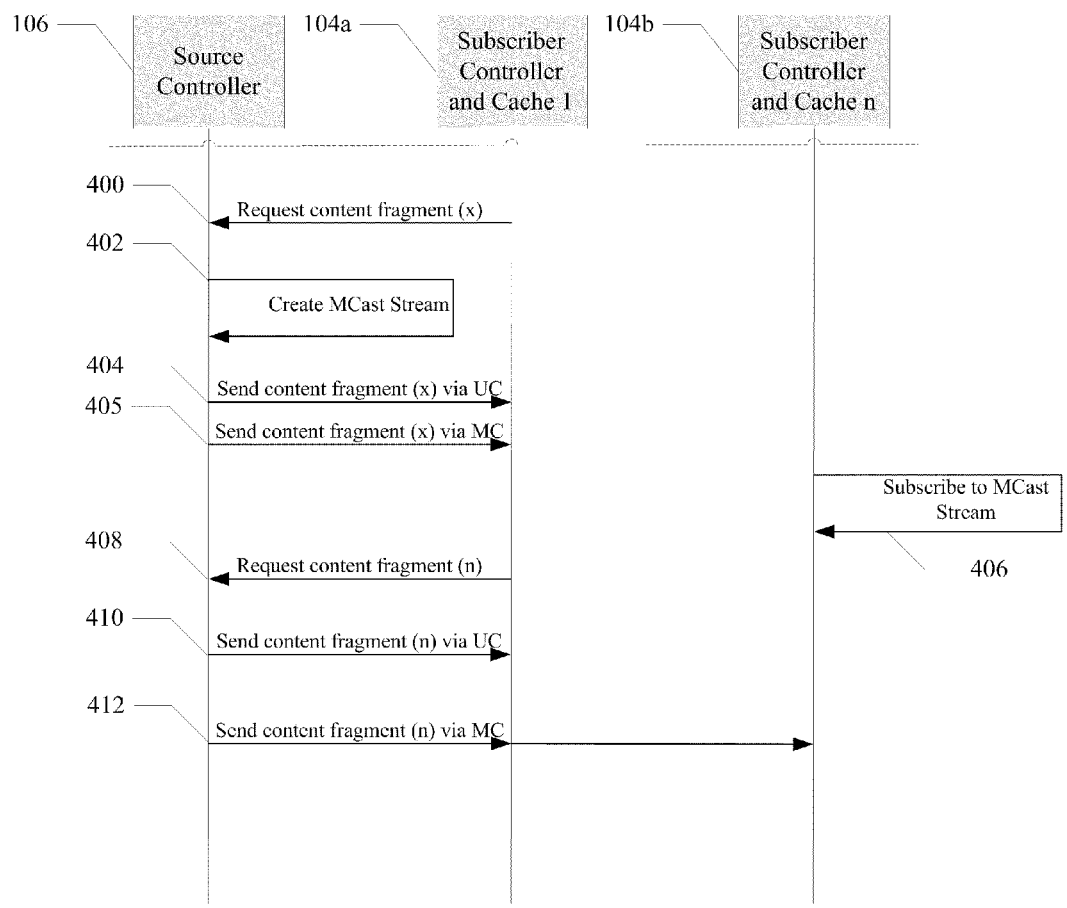
FIG. 4 illustrates a flow diagram of an embodiment of a driven delivery method.

A flow diagram of a driven delivery method according to an illustrative embodiment is described with reference to FIG. 4. As illustrated in FIG. 4, a subscriber controller and cache 104a sends 400 a request for content to the source controller 106. The source controller 106 creates 402 a multicast stream that only sends a fragment via multicast when any subscriber controller and cache first requests the fragment. The source controller 106 then sends 404 a content fragment to the subscriber controller and cache 104a via unicast and sends 405 the same fragment via multicast.

A second subscriber controller and cache 104b can subscribe 406 to the multicast stream. In this illustrative embodiment, the leading subscriber controller and cache 104a, the subscriber controller and cache that makes requests first, receives content via unicast. As illustrated in FIG. 4, the leading subscriber controller and cache 104a requests 408 the next content fragment. In response to the request 408, the source controller 106 sends 410 data to the lead subscriber controller and cache 104a via unicast and sends 412 the same data via multicast for the benefit of non-lead subscriber controller and caches 104b.

Determination of when to setup and transmit content via multicast can be made by policy such as specific content being tagged as popular. Alternatively, the determination of when to setup and transmit content via multicast could be triggered by the second subscriber controller and cache 104b requesting the same content. In addition, such policies can be made adaptive based on the congestion state of the paths in the network. For example, if there is a shared network segment in the path that is congested then the policy to start sending via multicast may be deferred until the second subscriber controller and cache 104b joins where the transmission path to the subscriber controller and cache 104b includes the congested segment.

If a mutlicast group has been started, then non-lead subscriber controller and cache 104b will have the requests locally cached in the subscriber controller and cache 104*b* as a result of receiving via multicast. The non-lead subscriber controller and caches 104*b* may also use unicast to receive content initially until the cache in the subscriber controller and cache 104*b* contains data received via the multicast transmission. This is because the non-lead subscriber controller and cache 104*b* is consuming the content at a lag time relative to the lead subscriber controller and cache 104*a* and only started receiving the multicast content after some number of initial fragments have already been transmitted. Therefore, the non-lead subscriber controller and cache 104*b* receives the missed fragments via unicast while at the same time receiving future fragments via multicast.

The multicast stream may be shut down after the last fragment of the content is served. A downside to this simple delivery model is that non-lead subscriber controller and caches 104*b* might join a multicast transmission near the end and thus the efficiency effect is low.

In an illustrative embodiment, a rotating delivery may be used. A flow diagram of a rotating delivery method according to an illustrative embodiment is described with reference to FIG. 5. The rotating delivery addresses the shortcomings of the driven delivery described above, by restarting the multicast transmission of the content once the end is reached provided at least one subscriber controller and cache 104*a* or 104*b* is still subscribed to the multicast stream. Rotating delivery can be used with the standalone or driven delivery model.

Figure 5:
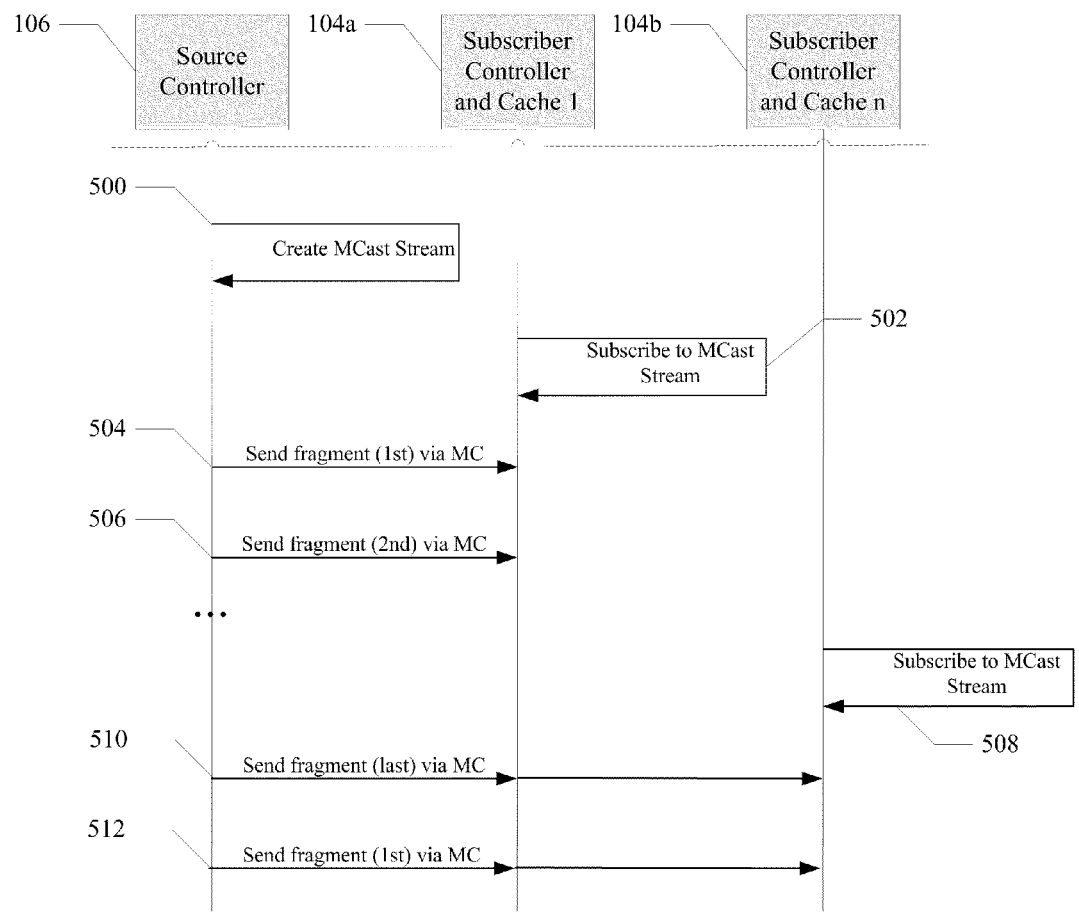
FIG. 5 illustrates a flow diagram of an embodiment of a rotating delivery method.

As illustrated in FIG. 5, the source controller 106 creates 500 a multicast stream for a requested content, and a first subscriber controller and cache 104*a* subscribes 502 to the multicast stream. The source controller 106 sends 504 a first content fragment to the first subscriber controller and cache 104*a* via multicast. The source controller 106 then sends 506 a second content fragment to the first subscriber controller and cache 104*a* via multicast and so on. Later a second subscriber controller and cache 104*b* subscribes 508 to the multicast stream. However, the second subscriber controller and cache 104*b* has subscribed late in the multicast stream for the content. The source controller 106 then sends 510 a last content fragment to the first and second subscriber controller and caches 104*a* and 104*b* via multicast. In the rotating delivery method, the multicast stream does not end but restarts once the end is reached. Thus, the source controller 106 then resends 512 the first content fragment to the first and second subscriber controller and caches 104*a* and 104*b* via multicast and so on.

In an illustrative embodiment, a partitioned rotating delivery may be used. The partitioned delivery uses multiple multicast streams to transmit various sections of a piece of content, for example, a separate multicast stream can be transmitted for each section operating in parallel. For example, a 90 minute movie might split into 18 sections, and thus 18 multicast streams, of 5 minutes worth of content. Each multicast stream repeats its section transmission over and over again provided at least one subscriber controller and cache 104 is still subscribed to the multicast stream.

This approach creates an upper bound on the unicast transmission for each subscriber controller and cache 104, in our example 5 minutes. After that, the subscriber controller and cache 104 is guaranteed to receive the data via multicast transmission. However, this delivery method is more complex than the others, since it needs a more elaborate subscriber controller and cache 104 implementation that manages switching to new multicast groups as section boundaries are reached.

In an illustrative embodiment, a method of adjusting delivery rates may be used. Even with good network throughput stability, there are cases when delivery of a particular network channel slows down to the point where content cannot be received fast enough to keep up with the consumption of the subscriber controller and cache 104 or the loss rate exceeds that allowing for reassembly. As described above, the system may automatically switch to unicast. If the network slowdown is systemic, many subscriber controller and caches 104 will switch to unicast at the same time causing worse congestion.

To address this issue, multiple delivery bit rates for video and audio are available. In a production system, multiple bit rates of the same content may be transmitted via multicast for an active group.

The subscriber controller and cache 104 detects a network slowdown by observing the time it takes to receive a fragment and checking this duration against the length of media content the fragment provides. For example, if 5 two-second fragments are received in 3 seconds each, 1*5 seconds worth of buffer was lost due to lag. In addition, the subscriber controller and cache 104 can use the recent loss rate as input to the algorithm to determine what bit rate to request.

Using this and other heuristics, if a subscriber controller and cache 104 detects a significant slowdown, the subscriber controller and cache 104 switches to a lower rate multicast transmission that will lower the fragment transmission rate. The subscriber controller and cache 104 can determine what bit rate transmissions are available for the content from the NCDC 110. This information can be sent in the control plane 114.

Similarly, when files are received fast enough at a low enough loss rate so that a higher bit rate can be supported, the subscriber controller and cache 104 can switch back to the higher bit rate multicast group. The rate switching algorithm can include hysteresis to avoid switching at too high a rate and too frequently.

As described above with reference to FIG. 1, the CDS 100 includes a control plane 114, which communicates the types of requests that are handled by the CDS 100 between the subscriber controller and cache 104, the source controller 106, and the NCDC 110. In an illustrative embodiment, the control plane 114 is used to communicate available groups to both the source controller 106 and the subscriber controller and cache 104, and any changes with the NCDC 110. The implementation of the control plane 114 protocol may be Extensible Messaging and Presence Protocol (XMPP). In essence, the NCDC 110 may act as an XMPP bot listening for presence declarations and incoming messages.

When the source controller 106 and/or the subscriber controller and cache 104 are initialized, the source controller 106 and/or the subscriber controller and cache 104 announce their initial presence to the XMPP server on the NCDC 110 and in addition join a multi-user chat (MUC) to which announcements are made. When the NCDC 110 receives an initial presence the NCDC 110 sends the current list of all groups to the source controller 106 and the subscriber controller and cache 104.

When a group is added, modified or deleted, the NCDC 110 sends a broadcast to the multi-user chat (MUC). The source controller 106 and the subscriber controller and cache 104 are expected to detect these announcements and adjust their group listing accordingly. When a group is deleted, the source controller 106 and the subscriber controller and cache 104 are expected to shut down its multicast server or multicast client.

In addition to group state broadcasting, the NCDC 110 can also be configured via XMPP messaging. Further, queries and inserts can be used to modify the groups and request various state updates.

In an illustrative embodiment, fully qualified Jabber Ids (JIDs) are used as Ids for the subscriber controller and cache 104, the source controller 106, the NCDC 110, and Command Language Interface (CLI), which is a management interface used to configure/control the system. The common format of the JID is:

<node-name>@<ncdc-hostname>/ncdc

For the multi-user chat (MUC) this becomes:

caches @<ncdc-hostname>/<node-name>

The NCDC 110 is reachable under the following JID:

ncdc@<ncdc-hostname>/ncdc

Note: Since the resource part is "ncdc", an implementation might choose to hide this detail.

In an illustrative embodiment, a simple XML format is used to encode groups for transmission within XMPP stanzas. Illustratively, all elements are in the cdn:data namespace. The root element is called <group> and contains the title and type attribute. The title of the group is typically an identifier by which the group can later be accessed. The type of the group specifies how the group and its data are handled in the various caches. Optionally, the root element can contain any number of child elements. The element name is property name within the group and the element's content is the corresponding value. As an illustrative example:

```
<group xmlns="cdn:data" type="live" title="style-live">
    <url_regex> http:
        //.../Style.isml/. *$</url_regex> <name>230 .0.0.3</name>
        <video_bitrate>150000</video_bitrate>
        <audio_bitrate>96000</audio_bitrate>
</group>
```

In an illustrative embodiment, a multi-user chat (MUC) presence may be made. For example:

```
Stanza: presence
From: caches@muc. <ncdc-hostname>/<cache-name>
To: ncdc@host/ncdc
```

When each of the subscriber controller and cache 104 and the source controller 106 initially start, the subscriber controller and cache 104 and the source controller 106 each register with the "caches@muc.<ncdc-hostname>" multi-user chat (MUC) group by sending a presence stanza to the NCDC 110. The NCDC 110 listens for this stanza and responds by sending a private message to each of the subscriber controller and cache 104 node and the source controller 106 node listing all available groups.

This call typically does not expect any application errors. If the NCDC 110 is not present when the subscriber controller and cache 104 and/or the source controller 106 enter the MUC, then the subscriber controller and cache 104 and/or the source controller 106 simply do not receive a list of groups. Once the NCDC 110 comes online it can send a list of groups to all the subscriber controllers and caches 104 and the source controllers 106 automatically.

An illustrative example of a Presence Declaration is shown below:

```
<presence from=' caches@muc.localhost/source'
        to='ncdc@localhost/ncdc' id='10'>
    <x xmlns='http://jabber.org/protocol/muc#user'>
        <item jid='source@localhost/ncdc' affiliation='none'
```

-continued

```
        role='participant'
    />
    </x>
</presence>
```

An illustrative example of a List of Groups is shown below:

```
<message to="source@localhost/ncdc"
type="chat" id="6">
    <groups xmlns="cdn:data">
        <group type="driven"
        title="ms-big-buck-bunny">
            <url_regex>" (. . . /BigBuckBunny_1080p.ism) / .
            *$</url_regex>
            <name>230.0.0.1</name>
            <video_bitrate>350000</video_bitrate>
            <audio_bitrate>64000</audio_bitrate>
        </group>
        <group type="driven" title="netflix">
            <url_regex>"(http://.*netflix.*/.*\.wmv)/.*$</url_regex>
            <name>230 .0.0.2</name>
        </group>
    </groups>
</message>
```

In an illustrative embodiment, a group announcement may be made. For example:

```
Stanza: message
Type: groupchat
From: caches@muc. <ncdc-hostname>/ncdc
To: ncdc@host/ncdc
```

When groups are added to the NCDC 110, the NCDC 110 announces the new group to the subscriber controller and cache 104 and/or the source controller 106 via MUC. The NCDC 110 typically does not expect any responses or application errors. The subscriber controllers and caches 104 and the source controllers 106 are expected to handle the incoming message properly and add a new group to their list of groups.

An illustrative example of a MUC Announcement is shown below:

```
<message from='   caches@muc.localhost/ncdc'
    to='ncdc@localhost/ncdc'
            type=' groupchat' id=' 10'>
        <announcement xmlns=' cdn : ncdc : group: announce'>
            <group xmlns="cdn:data" type="live"
            title="style-live">
                <url_regex> http: //. . ./Style.isml/ . *$</url_regex>
                <name>230 .0.0.3</name>
                <video_bitrate>150000</video_bitrate>
                <audio_bitrate>96000</audio_bitrate>
            </group>
        </announcement>
</message>
```

In an illustrative embodiment, a group denouncement may be made. For example:

```
Stanza: message
Type: groupchat
From: caches@muc. <ncdc-hostname>/ncdc
To: ncdc@host/ncdc
```

When groups are removed from the NCDC 110, the NCDC 110 denounces the removed group using the subscriber controller and cache 104 and/or the source controller 106 via MUC. The NCDC 110 typically does not expect any responses or application errors. The subscriber controllers and caches 104 and the source controllers 106 via MUC are expected to handle the incoming message properly and remove the group from their list.

An illustrative example of a MUC Denouncement is shown below:

```
<message from=' caches@muc.localhost/ncdc' to='ncdc@localhost/ncdc'
        type=' groupchat' id=' 7'>
    <denouncement xmlns=' cdn : ncdc : group: denounce'>
        <group xmlns=' cdn : data' type=' driven' title=' cdn-bb' />
    </denouncement>
</message>
```

In an illustrative embodiment, a list users request may be made. For example:

```
Stanza: iq
Type: get
Namespace: http://jabber.org/protocol/disco#items
```

This request makes a simple DISCO-compliant inquiry of the items in the subscriber controller and cache 104 and/or the source controller 106 via MUC. The result is a standard listing of all the source controllers 106 and subscriber controller and caches 104 registered in the MUC.

An illustrative example of a Request is shown below:

```
<iq to="caches@muc.localhost" type="get" id="5">
    <query xmlns="http:// jabber. org/protocol/disco#items" />
</iq>
```

An illustrative example of a Response is shown below:

```
<iq from='caches@muc.localhost' to='cli@localhost/ncdc'
        id='5' type='result'>
    <query xmlns='http:// jabber.org/protocol/disco#items'>
        <item jid=' caches@muc.localhost/ncdc' name='ncdc' />
    </query>
</iq>
```

As described above, the NCDC 110 manages the list of all available groups. In an illustrative embodiment, a group list query may be made. For example:

```
Stanza: iq
Type: get
To: ncdc@host/ncdc
Namespace: cdn : ncdc : groups
```

The call illustrated above retrieves a full list of all available groups and their details from the NCDC 110. A simple custom query element specifies the data of interest:
<query xmlns="cdn:ncdc:groups"/>

This call is typically not expected to fail on the application level. If no groups exist, an empty list is returned.

An illustrative example of a Request for the list of groups is shown below:

```
<iq to="ncdc@localhost/ncdc" type="get" id="10">
    <query xmlns="cdn:ncdc:groups" />
</iq>
```

An illustrative example of a Response for the list of groups is shown below:

```
<iq xmlns="jabber:client" from="ncdc@localhost/ncdc"
        type="result" id="10">
    <query xmlns="cdn:ncdc:groups">
        <groups xmlns="cdn:data">
            <group type="driven" title="ms-big-buck-bunny">
                <url_regex> http: //...
                    /BigBuckBunny_720p.ism/ .
                    *$</url_regex>
                <name>230 .0.0.1</name>
                <video_bitrate>350000</video_bitrate>
                <audio_bitrate>64000</audio_bitrate>
            </group>
            <group type="live"
                title="style-live">
                <url_regex> http: //.. . /Style.isml/ .
                    *$</url_regex>
                <name>230 .0.0.3</name>
                <video_bitrate>150000</video_bitrate>
                <audio_bitrate>96000</audio_bitrate>
            </group>
        </groups>
    </query>
</iq>
```

In an illustrative embodiment, a single group query may be made. For example:

```
Stanza: iq
Type: get
To: ncdc@host/ncdc
Namespace: cdn : ncdc : group
```

This call retrieves all details of one particular group. A simple custom query element specifies the data of interest:
<query xmlns="cdn:ncdc:group"/>

When a group is not found, an error is typically returned. In this illustrative embodiment, the error code is 410.

An illustrative example of a Request for a group is shown below:

```
<iq to="ncdc@localhost/ncdc" type="get" id="10">
    <query xmlns="cdn:ncdc:group" title="style-live" />
</iq>
```

An illustrative example of a Success Response for a group is shown below:

```
<iq xmlns="jabber:client" from="ncdc@localhost/ncdc"
        type="result"
id="10">
    <query xmlns="cdn : ncdc : group">
        <group xmlns="cdn:data" type="live" title="style-live">
            <url_regex> http: //.. ./Style.isml/ . *$</url_regex>
            <name>230 .0.0.3</name>
            <video_bitrate>150000</video_bitrate>
            <audio_bitrate>96000</audio_bitrate>
        </group>
    </query>
</iq>
```

An illustrative example of as Error Response for a group is shown below:

```
<iq xmlns="jabber:client" from="ncdc@localhost/ncdc"
        type="error" id="10">
```

```
<query xmlns="cdn:ncdc:group"/>
<error code="410" type="cancel">
    <tag/>
    <text xmlns="urn:ietf:params:xml:ns:xmpp-stanzas">Unknown title.</t
    </error>
</iq>
```

In an illustrative embodiment groups may be added. For example:

```
Stanza: iq
Type: set
To: ncdc@host/ncdc
Namespace: cdn : ncdc : group: add
```

This iq stanza inserts a new group into the NCDC 110. The query uses a custom namespace and the standard group XML representation. This request can fail, if another group with the same title has already been added. In this illustrative embodiment, Error code 420 is used.

An illustrative example of a Request to add a group is shown below:

```
<iq to="ncdc@localhost/ncdc" type="set" id="10">
    <query xmlns="cdn : ncdc : group: add">
        <group xmlns="cdn:data" type="driven" title="cdn-bb">
            <name>230 .0.0.5</name>
            <url_regex>
                ^(http: //cdn.a-bb.net/BigBuckBunny) / .*$
            </url_regex>
            <video_bitrate>350000</video_bitrate>
            <audio_bitrate>64000</audio_bitrate>
        </group>
    </query>
</iq>
```

An illustrative example of a Success Response is shown below:

```
<iq from=' ncdc@localhost/ncdc' to=' cli@localhost/ncdc' id='10'
        type='result'>
    <query xmlns=' cdn : ncdc : group: add' />
</iq>
```

An illustrative example of an Error Response is shown below:

```
<iq from=' ncdc@localhost/ncdc' to=' cli@localhost/ncdc'
        id='10' type='error'>
    <query xmlns=' cdn : ncdc : group: add' />
    <error code='420' type='cancel'>
        <tag/>
        <text xmlns='urn:ietf:params:xml:ns:xmpp-stanzas'
                >('Group with given title already registered.',
                ' cdn-bb' ) </text>
    </error>
</iq>
```

In an illustrative embodiment groups may be removed. For example:

```
Stanza: iq
Type: set
To: ncdc@host/ncdc
Namespace: cdn : ncdc : group: remove
```

This iq stanza removes a group from the NCDC 110. The query typically uses a custom namespace and the standard group XML representation. In this illustrative embodiment, the request can fail, if no group with the specified title exists. added.

An illustrative example of a Request to remove a group is shown below:

```
<iq to="ncdc@localhost/ncdc" type="set" id="10">
    <query xmlns="cdn : ncdc : group: remove">
        <group xmlns="cdn:data" type="driven" title="cdn-bb"/>
    </query>
</iq>
```

An illustrative example of a Success Response to remove a group is shown below:

```
<iq from=' ncdc@localhost/ncdc' to=' cli@localhost/ncdc' id='12'
        type='result'>
    <query xmlns=' cdn : ncdc : group: remove' />
</iq>
```

An illustrative example of an Error Response to remove a group is shown below:

```
<iq from=' ncdc@localhost/ncdc' to=' cli@localhost/ncdc' id='10'
        type='error'>
    <query xmlns=' cdn : ncdc : group: remove' />
    <error code='421' type='cancel'>
        <tag/>
        <text xmlns='urn:ietf:params:xml:ns:xmpp-stanzas'
                >u' cdn-bb' </text>
    </error>
</iq>
```

Figure 6:
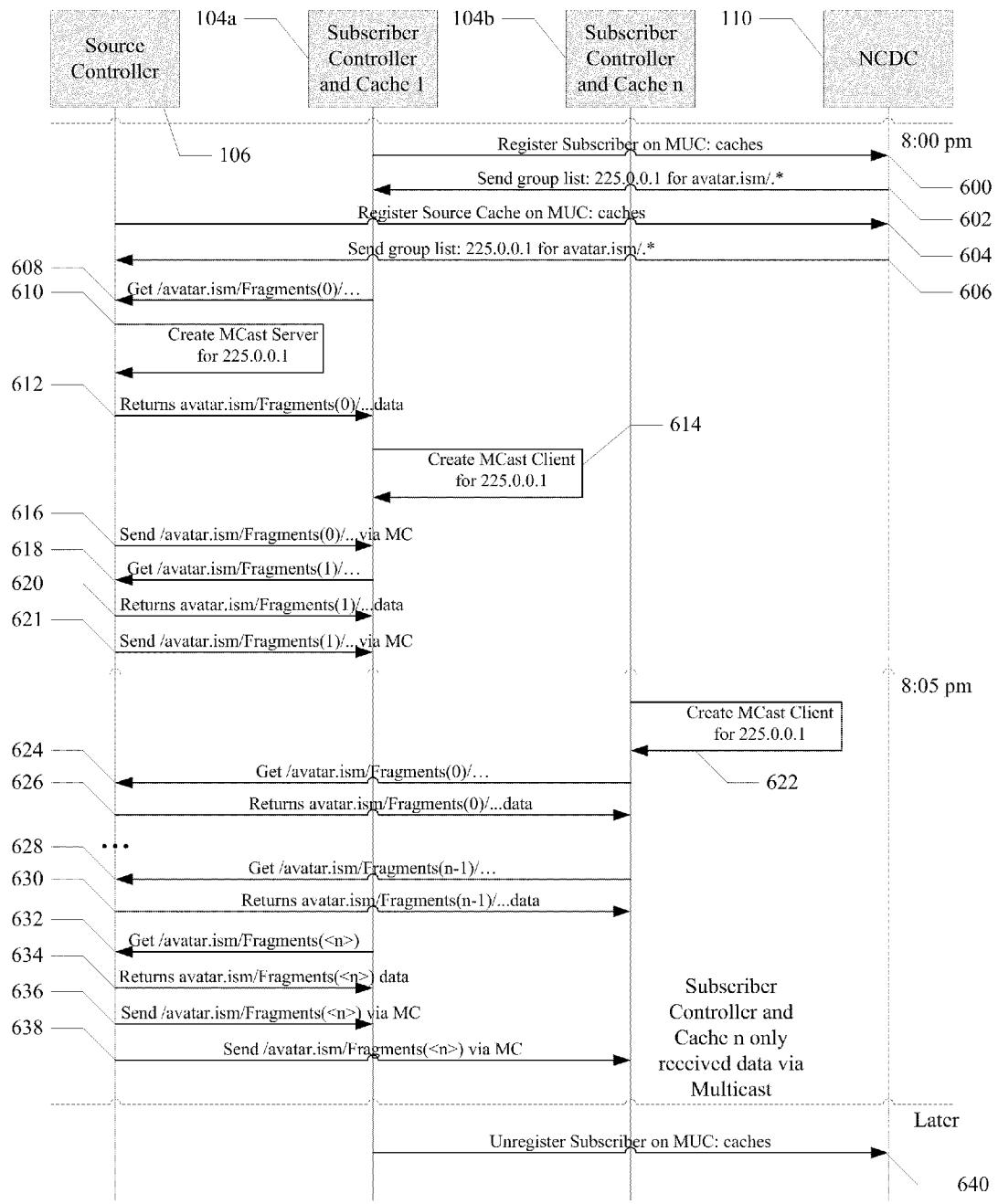
FIG. 6 illustrates a flow diagram of an embodiment of the CDS delivering a video on demand.

A flow diagram of the CDS 100 delivering video on demand content to two subscribers according to an illustrative embodiment is described with reference to FIG. 6. As illustrated, a first consumer starts watching the movie "Avatar" at about 8:00 pm, and at about 8:05 pm a second consumer also starts watching the same movie. When the first consumer requests the movie a first subscriber controller and cache 104*a* is initialized and announces the first subscriber controller and cache's 104*a* presence on the NCDC 110 XMPP server and registers on a MUC by sending an initial presence message to the NCDC 110, illustrated as 600. When the NCDC 110 receives the initial presence message from the first subscriber controller and cache 104*a* the NCDC 110 sends a current list of all groups, including a multicast group (225.0.0.1) for the "avatar" group, to the first subscriber controller and cache 104*a*, illustrated as 602.

Additionally, the source controller 106 is initialized and announces the source controller's 106 presence on the NCDC 110 XMPP server and registers on the MUC by sending an initial presence message to the NCDC 110, illustrated as 604. When the NCDC 110 receives the initial presence message from the source controller 106 the NCDC 110 sends the current list of all groups, including a multicast group (225.0.0.1) for the "avatar" group, to the source controller 106, illustrated as 606.

Once the first subscriber controller and cache 104a and the source controller 106 are registered on the MUC, the first subscriber controller and cache 104a sends a request for content of the movie "Avatar" to the source controller 106, illustrated as 608. When the source controller 106 receives the request for content the source controller 106 creates a multicast server on the source controller 106 for the "Avatar" group (225.0.0.1), illustrated as 610. Then the source controller 106 returns a first fragment of the movie content to the first subscriber controller and cache 104a, illustrated as 612. When the first subscriber controller and cache 104a receives the first fragment the first subscriber controller and cache 104a creates a first multicast client on the first subscriber controller and cache 104a for the "Avatar" group (225.0.0.1), illustrated as 614.

The source controller 106 also sends the first fragment of the movie content to the first subscriber controller and cache 104a via multicast, illustrated as 616. Then, the first subscriber controller and cache 104a sends a request for a second fragment of the movie "Avatar" to the source controller 106, illustrated as 618. The source controller 106 then sends the second fragment of the movie content to the first subscriber controller and cache 104a via unicast, illustrated as 620. The source controller 106 also sends the second fragment of the movie content via multicast, illustrated as 621.

At about 8:05 pm, the second consumer desires to begin watching the movie "Avatar." A second subscriber controller and cache 104b creates a second multicast client on the second subscriber controller and cache 104b for the "Avatar" group (225.0.0.1), illustrated as 622. The second subscriber controller and cache 104b will now receive fragments via multicast starting with fragment (n) illustrated as 630. However, the second consumer subscriber controller and cache 104b will not have any cache content for fragments 0 through n−1 as these were transmitted before it registered as a multicast client illustrated as 622. Therefore, the second subscriber controller and cache 104b requests and receives fragments 0 through n−1 via unicast as illustrated in 624 through 630.

The first subscriber controller and cache 104a sends a request for a next fragment of the movie "Avatar" to the source controller 106, illustrated as 632. The source controller 106 then sends the next fragment of the movie content to the first subscriber controller and cache 104a via unicast and sends the same fragment of the movie content to the first subscriber controller and cache 104a and the second subscriber controller and cache 104b via multicast, illustrated as 634 through 638. When all of the fragments have been sent, i.e. the movie ends, the first subscriber controller and cache 104a unregisters with the MUC by sending a message to the NCDC 110, illustrated as 640.

Figure 7:
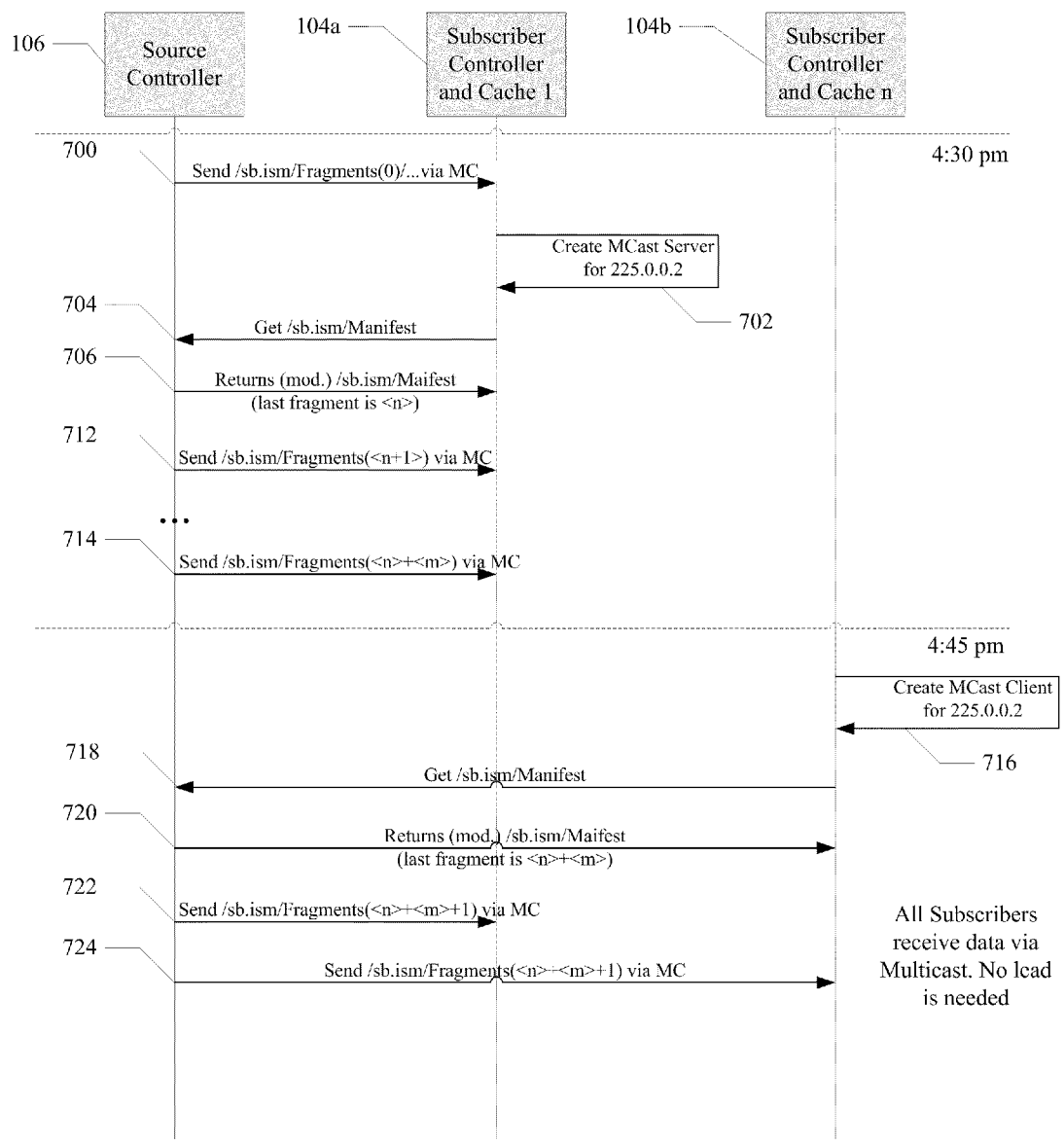
FIG. 7 illustrates a flow diagram of an embodiment of the CDS delivering a live stream.

A flow diagram of the CDS 100 delivering live content to two consumers according to an illustrative embodiment is described with reference to FIG. 7. In this scenario it is assumed that the live content has been configured to have a continual multicast policy so that the source controller 106 has already created a multicast server for the content and is already sending content fragments via multicast using the group 225.0.0.2, as illustrated by 700. As illustrated, a first consumer starts watching the live content at about 4:30 pm, and at about 4:45 pm a second consumer also starts watching the live content. Assuming the subscriber controllers and caches 104 and source controllers 106 are already set up and registered on the MUC, as described above, a first subscriber controller and cache 104a creates a first multicast client on the first subscriber controller and cache 104a for the group (225.0.02), illustrated as 702 and then sends a request for a live content manifest to the source controller 106, illustrated as 704.

The source controller 106 then returns the manifest to the first subscriber controller and cache 104a, illustrated as 706. The manifest includes the number (n) of the last fragment that has been sent for the live content. The source controller 106 continues sending the next fragments, fragments (n+1) and fragments (n+m) to the first subscriber controller and cache 104a via multicast, illustrated as 712 and 714. The first subscriber controller and cache 104a gets all the content starting with fragment n+1 via multicast.

At about 4:45 pm, the second consumer desires to begin watching the live content. A second subscriber controller and cache 104b creates a second multicast client on the second subscriber controller and cache 104b for the group (225.0.0.2), illustrated as 716. The second subscriber controller and cache 104b then sends a request for the manifest to the source controller 106, illustrated as 718. The source controller 106 then returns the manifest to the second subscriber controller and cache 104b, illustrated as 720. The manifest includes the last fragment number n+m. Now both subscriber controllers and caches 104a and 104b receive the next (n+m+1) and subsequent fragments of content via multicast. More particularly, the source controller 106 then sends the next fragment, fragment (n+m+1), to both the first subscriber controller and cache 104a and the second subscriber controller and cache 104b via multicast, illustrated as 722 and 724. Since in this scenario this is live content configured for continual multicast, the source controller 106 continues to send the next fragments.

In an illustrative embodiment, Microsoft's Smooth Streaming is used by the CDS 100. While it is possible to use the CDS 100 with any HTTP based multimedia stream, Microsoft's Smooth Streaming is well suited for the CDS 100 architecture.

The manifest of a Smooth Stream is an XML file that lists all available quality levels and fragments of the full content. Additional fields specify various other properties of the multimedia content such as encodings and timing. The source controller 106 uses the manifest exclusively to determine its state and capabilities.

Since all content-related requests, including the manifest, are intercepted by the source controller 106, the CDS 100 is provided with the opportunity to manipulate the manifest for the benefit of the CDS 100. For example, this allows the CDS 100 to restrict the available bit rates to a smaller subset or even just one rate. Further, this allows for that ability to hide undesired fragments or insert new ones such as commercials.

Typically, fragment URLs are easily constructed in Smooth Streaming and contain a bit rate, media type (video or audio) and the fragment id. Thus, the subscriber controller and caches 104 have an easy opportunity to rewrite the URL before requesting a response from the source controller 106. For example, a lower or higher bit rate can be requested.

Furthermore, the content of a fragment may be a standard MP4 container, which carries the actual bit rate and fragment id. Thus, the consumer device 102 is even able to handle content that does not properly correspond to the requested URL. For example, if a video fragment with a bit rate of 350 k bps is requested, the returned content can be delivered in 150 k bps and the consumer device 102 will be able to handle the response allowing another opportunity to manipulate the response.

In an illustrative embodiment, the CDS 100 includes predictive listening. To support "channel surfing" with minimal latency as each new channel is selected, the CDS 100 can apply a policy to subscribe to a set of adjacent content channels (those next lower and next higher in the channel list). Then, as the consumer clicks up or down through the channels, the content will already be available in the local cache of the subscriber controller and cache 104.

This policy can include the number of adjacent channels included in the auto-subscription so that the CDS 100 can be tuned to trade off between latency when surfing against bandwidth use. In addition to the simple adjacent channel policy, the CDS 100 can also include predictive listening based on the past measured view statistics of each channel. Using those statistics the CDS 100 can predict which channels are likely to be viewed on each network segment and/or by each consumer and then automatically create multicast streams for popular channels and/or automatically subscribe a subscriber controller and cache 104 to a channel or multicast stream independent of consumer action.

In an illustrative embodiment, the CDS 100 includes Digital Video Recording (DVR). DVR can be achieved by saving fragments in the cache of the subscriber controller and cache 104. A custom manifest can be created that contains only the recorded bit rate and the fragments that were actually received during the recording. The manifest can also be used to store additional meta-data about the content, such as title, description, copyright, actors, etc. Further, an additional component of the subscriber controller and cache 104 can provide the features to the consumer to control when and what to record, and manage the recordings.

In an illustrative embodiment, the CDS 100 incorporates advertisement insertion technology. The advertisement insertion technology may be incorporated both network-wide and locally where the local insertion places adverts for a local distribution area with adverts that are typically for a single consumer or a local distribution area with adverts that are typically for local services, etc.

The CDS 100 can provide advertisement insertion support by adding features to allow the manipulation of the content and manifest(s) of regular content to insert content and fragments that represent the inserted adverts. In this way, there is no requirement on the consumer device 102, the mechanism is transparent to the consumer device 102.

Advertisement insertion is performed by the source controller 106 or the subscriber controller and cache 104. In network-wide advertisement insertion, the source controller 106 in FIG. 1 is configured to insert advertisement content into a content stream being received from the content source server 108. The configuration may include polices for the insertion time which may be relative to time of day or time with the content stream; the advertisement content to insert at each time is also configured, which may also be specific for each content stream. When the content is received by the source controller 106 as fragments as explained earlier, the source controller 106 inserts the advertisement content by replacing the original fragment with the advertisement content and also copying the original fragment to a new fragment whose fragment number corresponds to the time at which the advertisement content ends and the original content will resume. For example, the original content may have fragment numbers 100 through 130 which represent 30 seconds of content. The advertisement to be inserted has 30 seconds of content with fragment numbers 0 through 15 where each advertisement fragment contains a different time length of content compared to the original content. When the source controller 106 would send fragment 100 of the original content, the source controller 106 instead sends fragment 0 of the advertisement content but does so by overwriting the data of fragment 100 of the original content with the data of fragment 0 of the advertisement content. The overwriting process may also use part of a single advertisement fragment of parts of more than 1 advertisement fragment if the time length of the original fragment being replaced needs to be preserved for transparency at the consumer device. As subsequent advertisement fragments are substituted into the content stream, the source controller 106 stores the original fragment data that has been replaced. Once the advertisement content end is reached, the source controller 106 resumes sending the original content starting with the data from original fragment 100, but the actual fragment number has now advanced because of the inserted advertisement content. When the source controller 106 is receiving content as fragments from the content source server 108, the source controller 106 maintains knowledge of how to change the received fragment before sending to the subscriber controller and cache 104. For example, the source controller 106 changes the fragment number to compensate for the advertisement insertion that has already been done. In addition if the advertisement insertion has required partial fragment replacement then the source controller 106 also reassembles the correct data into each new fragment the source controller 106 sends.

If the advertisement insertion is local then it is done by the subscriber controller and cache 104. The original content may be adjusted by the source controller 106 to add advertisement insertion periods which are then recognized by the subscriber controller and cache 104. In this case the subscriber controller and cache 104 uses local policy including advertisement content and content stream and time of day or time in content to replace the content fragments received from the source controller 106 with the local advertisement content. If a local subscriber controller and cache 104 has no local advertisement for a particular content stream or time defined then the subscriber controller and cache 104 simply sends the content from the source controller 106 which may include network-wide default advertisement content inserted using the network-wide technique describer earlier by the source controller 106.

Alternatively, the source controller 106 may not be adjusting the original content with advertisement insertion. In this case, the local subscriber controller and cache 104 implements an algorithm similar to the network-wide source controller algorithm to insert advertisements and adjust the original content. Any subscriber controller and cache 104 can do advertisement insertion in this way including the subscriber controller and cache 104 for a specific consumer. Therefore, the advertisement insertion can be localized at any level including a specific consumer.

If a subscriber controller and cache 104 serves more than one local area for the purposes of advertisement insertion, then the subscriber controller and cache 104 may perform different advertisement insertions for each local area on the same content stream the subscriber controller and cache 104 is receiving. In this case, the subscriber controller and cache 104 operates per-local-area instances of the advertisement insertion algorithm and it uses different multicast groups to send the content to each local area.

The CDS 100 has been primarily described above as using a two-level distribution hierarchy using the source controller 106 and the subscriber controller and cache 104. In an illustrative embodiment, the source controller 106 and the subscriber controller and cache 104 can also be placed on the same physical node, for example on a Distribution System, allowing arbitrarily deep delivery hierarchies. An example of a deep delivery hierarchy according to an illustrative embodiment is described with reference to FIG. 8. According to FIG. 8, one or more Distribution Systems 800*a-c* may be included in the system. The Distribution System(s) 800a-c is illustratively one or more servers, computers, processors, and/or databases. A source controller and a subscriber controller and cache may be placed within the Distribution System 800a-c.

Figure 8:
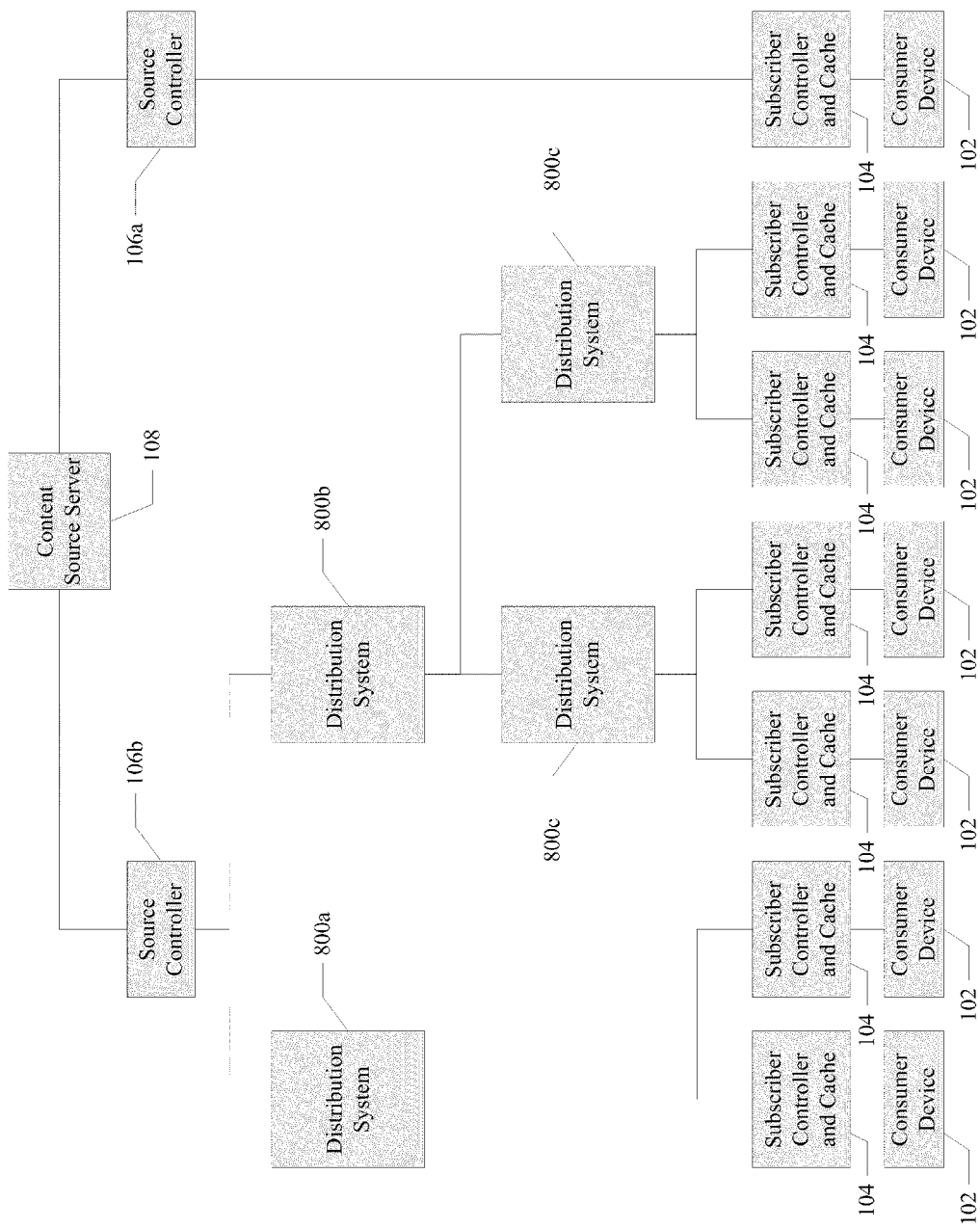
FIG. 8 illustrates an embodiment of a deep delivery hierarchy.

As illustrated in FIG. 8, a content source server 108 can be in communication with one or more source controllers 106a and 106b. The source controller 106a is in communication with one or more subscriber controller and caches 104, in the two-level distribution hierarchy. The source controller 106b is in communication with one or more Distribution Systems 800a and 800b, in a deep delivery hierarchy. The Distribution System 800a is in is in communication with one or more subscriber controller and caches 104. The Distribution System 800b is in communication with an additional one or more Distribution Systems 800c, which in turn are each in communication with one or more subscriber controller and caches 104. It should be appreciated by one skilled in the art that FIG. 8 is merely one example of a deep delivery hierarchy and that any number of Distribution Systems 800a-c can be placed within the hierarchy.

Where a provider's distribution network is large, a deep delivery hierarchy provides the ability to make the CDS 100 solution scalable. In particular, the deep delivery hierarchy allows for the multicast distribution to be hierarchically segmented allowing different multicast groups to be used for the same content at different levels of the hierarchy, thus reducing the span of a specific multicast group. The deep delivery hierarchy also allows for local distribution of source controllers 106 allowing purely local content to be restricted to only the local part of the network.

In another illustrative embodiment, the source controller 106 and the subscriber controller and cache 104 can also be placed on the same physical node, for example on a Network-to-Network Gateway, at the edges of a provider's network where that network joins another provider's network. The Network-to-Network Gateway illustratively includes one or more servers, computers, processors, and/or databases. In this embodiment such a combined system provides an inter-network gateway function. In this way a provider A's content can be made available to its consumers while those consumers are physically attached to a provider B's network (remote subscribers). Such an inter-network gateway acts in effect as an aggregate consumer representing the aggregate of all remote consumers. The default polices and algorithms of the subscriber controller and cache 104 can be modified to optimize the inter-network gateway role. For example, an inter-network gateway of provider B with a large number of remote consumers will want a more aggressive pre-caching and cache retention policy than a normal subscriber controller and cache 104.

In an illustrative embodiment, the CDS 100 can be optimized by providing interaction with a resource management system such as an Active Broadband Networks Active Resource Manager (ARM). The ARM system(s) measure the activity of each consumer and the congestion state of each network segment. This information can be used as input to the CDS 100 to allow the CDS 100 to make optimal decisions such as what bit rate to use for content. For example, when network segments are congested the announced manifests of available content can have their bit rates reduced.

The ARM can also be used as an Application Manager in which role the CDS 100 can request that the ARM request specific resources be setup for a content to be delivered between the last hop router, such as a cable modem termination system (CMTS) in a Cable network, and the subscriber controller and cache 104. In a Cable network, the ARM uses a PacketCable MultiMedia (PCMM), which is part of the Cablelabs DOCSIS® standard suite, to set up gates on the CMTS which reserve resources to be used for the content delivery. In a Digital Subscriber Loop (DSL) or similar network, or a WiFi network or 3GPP or 4GPP wireless network, the ARM uses protocols such as RADIUS or DIAMETER to reserve resources to be used for content delivery.

The ARM can reserve resources whether the delivery is via multicast or unicast. In either unicast or multicast, the interworking between the CDS 100 and the ARM allows for optimized delivery of content through dynamic resource reservation on the network segment.

In an illustrative embodiment, each consumer device 102, to which the subscriber controller and cache 104 is attached, may use multiple downstream channels for reception of data, such as in a Cable network that uses DOCSIS® 3.0. Within the same MAC-layer segment different consumer devices 102 may be using different sets of channels. These sets may be non-overlapping or they may have some channels in common. Moreover, the set of channels is use by a consumer device 102 can change over time. Finally, consumer devices 102 with different DOCSIS® version capabilities have restrictions on which channels they can use. This creates a specific set of problems for optimized delivery of multicast in this case. By default, each specific set of channels on which a subscriber exists that requests the same multicast group will result in a separate transmission of the multicast packets over its channel set. Where there is overlap between the sets this causes multiple copies of the same data to be sent where only one copy is required with resulting waste of transmission resources.

Extension of the combined CDS 100 and ARM systems can provide detection of the actual overlap of the channel sets and appropriate migration to add or remove multicast transmissions by manipulating the subscriber controller and cache's 104 procedures for making multicast group join/delete requests. In this way the combined system can optimize the use of the last hop bandwidth by removing unnecessary multicast transmission.

While the systems and methods for network content delivery have been described and illustrated in connection with certain embodiments, many variations and modifications will be evident to those skilled in the art and may be made without departing from the spirit and scope of the disclosure. The systems and methods disclosed herein are thus not to be limited to the precise details of methodology or construction set forth above as such variations and modification are intended to be included within the scope of the disclosure. Moreover, unless specifically stated any use of the terms first, second, etc. do not denote any order or importance, but rather the terms first, second, etc. are used to distinguish one element from another.

What is claimed is:

1. A method of delivering content comprising:
   registering, by a source controller, on a multi-user chat by sending a message to a network content delivery controller (NCDC);
   receiving, by the source controller, a multicast group list in an Extensible Messaging and Presence Protocol (XMPP) from the NCDC in response to registering on the multi-user chat;
   receiving, by a source controller at a network edge, a request for content from a subscriber controller when the content does not exist in the subscriber controller;
   creating, by the source controller, a multicast stream for the requested content in response to receiving the request; and transmitting, by the source controller, the multicast stream to the subscriber controller when the subscriber controller is subscribed to the multicast stream, wherein the multicast stream delivers the requested content to a plurality of subscriber controllers.

2. The method of claim 1, wherein the creating the multicast stream, further includes creating, by the source controller, a specific multicast stream associated with a multicast group of the multicast group list.

3. The method of claim 1, further comprising creating, by the source controller, a plurality of multicast streams for popular multicast groups of the multicast group list.

4. The method of claim 1, wherein the transmitting the multicast stream includes transmitting, by the source controller, a plurality of content fragments to the subscriber controller.

5. The method of claim 4, further comprising replacing, by the source controller, at least one of the plurality of content fragments with at least one advertisement content fragment.

6. The method of claim 5, further comprising copying, by the source controller, the replaced at least one of the plurality of content fragments to at least one new content fragment corresponding to an end of the at least one advertisement content fragment.

7. A network content delivery method comprising:
receiving, by a network content delivery controller (NCDC), a first message from a first subscriber controller for registering with the NCDC;
registering, by the NCDC, the first subscriber controller on a multi-user chat in response to receiving the first message;
receiving, by the NCDC, a second message from a source controller on an edge of the network for registering with the NCDC;
registering, by the NCDC, the source controller on the multi-user chat in response to receiving the second message;
transmitting, by the NCDC, a multicast group list in an Extensible Messaging and Presence Protocol (XMPP) to the first subscriber controller and the source controller; and
automatically creating multicast stream by the source controller in response to receiving a request for content from the first subscriber controller, wherein the multicast stream delivers the content simultaneously to a plurality of subscriber controllers subscribed to the multicast stream, including the first subscriber controller.

8. A network content delivery system comprising:
a source controller on an edge of a network;
a subscriber controller in communication with to the source controller and configured to receive content via a multicast stream;
a network content delivery controller (NCDC) in communication with the subscriber controller and the source controller;
the source controller and the subscriber controller configured to register on a multi-user chat by sending a message to the NCDC;
the NCDC configured to transmit a multicast group list in an Extensible Messaging and Presence Protocol (XMPP) to each of the subscriber controller and the source controller in response to the source controller and the subscriber controller registering on the multi-user chat;
the source controller configured to initiate the multicast stream for transmitting the content in response to receiving a request for the content from the subscriber controller and to transmit the content to the subscriber controller via the multicast stream, wherein the multicast stream is adapted to deliver the content to a plurality of subscriber controllers; and
the subscriber controller configured to subscribe to the multicast stream and to receive the content via the multicast stream.

9. The network content delivery system of claim 8, further comprising a distribution system hierarchically placed between the subscriber controller and the source controller.

10. The network content delivery system of claim 9, wherein the distribution system includes a distribution system subscriber controller and a distribution system source controller on a same node.

11. The network content delivery system of claim 10, wherein the distribution system is a network-to-network gateway configured to allow distribution of the content from a first provider network into a second provider network.

12. The network content delivery system of claim 8, further comprising a resource manager configured to measure a congestion state of the network.

13. A method for automated multicast content delivery comprising:
registering, by a subscriber controller, on a multi-user chat by sending a message to a network content delivery controller (NCDC);
receiving, by the subscriber controller, a multicast group list in an Extensible Messaging and Presence Protocol (XMPP) from the NCDC in response to registering on the multi-user chat;
transmitting, by the subscriber controller, a request for content to a source controller when the content does not exist in the subscriber controller and in response to receiving a request for the content from a first consumer device on a network segment;
automatically creating, by the source controller, a multicast stream for the content in response to receiving the request for the content from the subscriber controller;
subscribing, by the subscriber controller, to the multicast stream;
receiving, by the subscriber controller, the content via the multicast stream;
transmitting, by the subscriber controller, the content to the first consumer device; and
subscribing, by a second subscriber controller, to the multicast stream in response to receiving a request for the content from a second consumer device.

14. The method of claim 13, further comprising automatically creating, by the source controller, a plurality of multicast streams for popular content.

15. The method of claim 14, further comprising automatically subscribing, by the subscriber controller, to at least one of the plurality of multicast streams of the popular content created by the source controller.

16. The method of claim 13, further comprising transmitting a unicast stream of the content to the second subscriber controller when the second consumer device requests the content of the multicast stream at a time later than the first consumer device.

17. The method of claim 13, further comprising collecting segment congestion data of the network segment by a resource manager.

18. The method of claim 17, further comprising adjusting content manifest in response to the segment congestion data.

19. The method of claim 18, wherein the adjusting includes:
- reducing a bit rate of the content manifest when the network segment is congested; and
- increasing the bit rate of the content manifest when the network segment is uncongested.

20. The method of claim 13, further comprising reserving resources on the network segment for delivery of the content.

21. The method of claim 20, wherein the reserving the resources includes reserving the resources on the network segment for delivery of the content using a Packet Cable MultiMedia technique.

* * * * *